United States Patent
Haulman

(10) Patent No.: US 12,236,477 B1
(45) Date of Patent: Feb. 25, 2025

(54) SEARCH ENGINE FOR AUTOMOTIVE DEALERSHIPS

(71) Applicant: OneAuctionView, LLC, Redlands, CA (US)

(72) Inventor: Skye Haulman, Redlands, CA (US)

(73) Assignee: ONEAUCTIONVIEW, LLC, Redlands, CA (US)

( * ) Notice: Subject to any disclaimer, the term of this patent is extended or adjusted under 35 U.S.C. 154(b) by 380 days.

(21) Appl. No.: 17/709,081

(22) Filed: Mar. 30, 2022

Related U.S. Application Data

(63) Continuation-in-part of application No. 17/074,516, filed on Oct. 19, 2020, now abandoned.

(60) Provisional application No. 62/923,366, filed on Oct. 18, 2019.

(51) Int. Cl.
| | |
|---|---|
| *G06Q 30/00* | (2023.01) |
| *G06Q 30/02* | (2023.01) |
| *G06Q 30/0601* | (2023.01) |
| *G06Q 30/08* | (2012.01) |

(52) U.S. Cl.
CPC ......... *G06Q 30/08* (2013.01); *G06Q 30/0278* (2013.01); *G06Q 30/0623* (2013.01); *G06Q 30/0631* (2013.01)

(58) Field of Classification Search
None
See application file for complete search history.

(56) References Cited

U.S. PATENT DOCUMENTS

| | | | | |
|---|---|---|---|---|
| 8,036,952 B2 * | 10/2011 | Mohr | ................. | G06Q 30/0611 |
| | | | | 705/26.64 |
| 8,326,662 B1 * | 12/2012 | Byrne | ................ | G06Q 30/0278 |
| | | | | 705/7.42 |
| 10,025,866 B2 * | 7/2018 | Baker | ................ | G06Q 30/0643 |

OTHER PUBLICATIONS

No Author "Best Practices for the Regulation of Internet Vehicle Sales" American Association of Motor Vehicle Administrators. (Year: 2019).*

* cited by examiner

*Primary Examiner* — Naeem U Haq
(74) *Attorney, Agent, or Firm* — Cislo & Thomas, LLP

(57) ABSTRACT

The present disclosure is directed to a system and method for overcoming lost opportunities in the world of car vetting, bidding, and acquisition. The present invention helps automotive industry individuals and businesses take advantage of opportunities to acquire cars that they previously would not have been able to purchase due to limitations in the present technology in the field. This may be accomplished through enabling a system to compile unstandardized information from various locations throughout the world and standardizing such information by factoring in various inconsistencies that exist based on fragmented descriptions and standards across the automotive industry. The present invention configures a system to allow users to sort through, track, and organize information in a way that has never existed enabling them to make real time decisions on acquisition of automobiles that would not otherwise be possible.

11 Claims, 3 Drawing Sheets

SEARCH ENGINE FOR AUTOMOTIVE DEALERSHIPS

CROSS-REFERENCE TO RELATED APPLICATION

This patent application is a continuation-in-part of U.S. patent application Ser. No. 17/074,516, filed Oct. 19, 2020, which is claims the benefit of U.S. Provisional Patent Application Ser. No. 62/923,366 entitled "Search Engine for Car Dealerships," filed Oct. 18, 2019, which applications are incorporated in their entirety here by this reference.

TECHNICAL FIELD

The disclosure relates generally to the field of aggregators for automotive auction sites, and more particularly, the management of multiple datasets sharing one or more automotive attributes collected from a plurality or multiplicity of automotive auction sites.

BACKGROUND

With normal auction sites users may login in with their individual username and password, from there they typically find the search function from within the site and perform the search for the types of vehicles they are looking for. Each auction site may typically provide a different layout for how the user will review and view vehicle information. There is no standardization within the auction sites. Some of the auction sites may not have a wide array of search filters. The auctions are not well suited for serving as an intermediary between buyers and sellers. These auction platforms consistently input the wrong trim, drive-train, transmission, as well as various other options. This level of inconsistency often leaves a user to deduce the correct options, drivetrain, trim, and various other descriptors from either inconsistent pictures or things such as OEM build sheets which are often not available. Once a user finds a vehicle that they like, they may click on such a vehicle and add it to a watch list. Next, a vetting process for determining the quality of the automobile may occur and once the vetting process is done by utilizing a service provider such as CARFAX, AUTO CHECK, KELLY BLUE BOOK or equivalent the user may place a proxy bid on the vehicle. This proxy bid may happen automatically for the user without the user physically being present at an auction and without them being on-line for an auction.

A typical automotive dealer looking to procure inventory may login to an auctions platform wherein it has been registered to conduct business. There are currently approximately a couple dozen different main on-line auction sites that a user may login to at different times throughout the day and conduct searches for vehicles within such sites for the inventory that they are looking to buy. When such a user finds vehicle that it likes it may add them to what is known as a "watch list." The dealer then may login to a separate service provider such as CARFAX or AUTOCHECK to perform vehicle history reports for those vehicles. A user may manually write the results in a note field within the watch list if title is clean, or if there is an accident etc., or there may also be a discrepancy that they want to be made aware of before bidding on such an automobile. The final stage of vehicle evaluation may be to determine book value, dealers located in the Western United States, for example, typically use service providers such as KELLY BLUE BOOK whereas dealers located in the Eastern United States may use NADA or BLACK BOOK. Prior art methods and systems are fragmented base on geographic region along with various other factors that will determine what evaluation tool the dealer may be required to use. The dealer may login to a subscribed service and input a VIN #into an online program and then input the miles, and add the equipment and trim based on what the vehicle is equipped with. In some embodiments, after an evaluation is completed, the user may typically write notes in a note field about the book value. The user may manually then place a proxy bid on the vehicle within the proxy field of a website. The users of prior art platforms must conduct all of these fragmented steps over a plurality of different auction platforms located in various areas around the world.

SUMMARY

Aspects of the present disclosure teach certain benefits in construction and use which give rise to the exemplary advantages described below.

The present specification discloses a computer-implemented method comprising receiving, from a client computer to a server, at a vehicle sales search engine a vehicle sales search request associated with a user account, the automotive sales search request comprising a vehicle attribution search term; responsive to receiving the automotive sales search request associated with the user account, processing the automotive sales search request to retrieve from a database a predetermined list of alias search terms associated with the vehicle attribution search term; associating, by the server, a proxy IP address with the user account; transmitting simultaneously the predetermined list of alias search terms to a first third-party vehicle sales search engine and a second third-party vehicle sales search engine utilizing the proxy IP address; receiving, from the first third-party vehicle sales search engine, a first search result that matches or otherwise corresponds with the predetermined list of alias search terms, where the search result includes a first dataset of vehicle descriptions; receiving, from the second third-party vehicle sales search engine, a second search result that matches or otherwise corresponds with the predetermined list of alias search terms, where the search result includes a second dataset of vehicle descriptions; and presenting in a user interface of the client computer the first multiplicity of vehicle descriptions and the second multiplicity of vehicle descriptions presented together in a predetermined order.

BRIEF DESCRIPTION OF DRAWINGS

Additional objects and features if the system and method will be more readily apparent from the following detailed description and appended claims when taken in conjunction with the drawings, in which:

Figure 1:
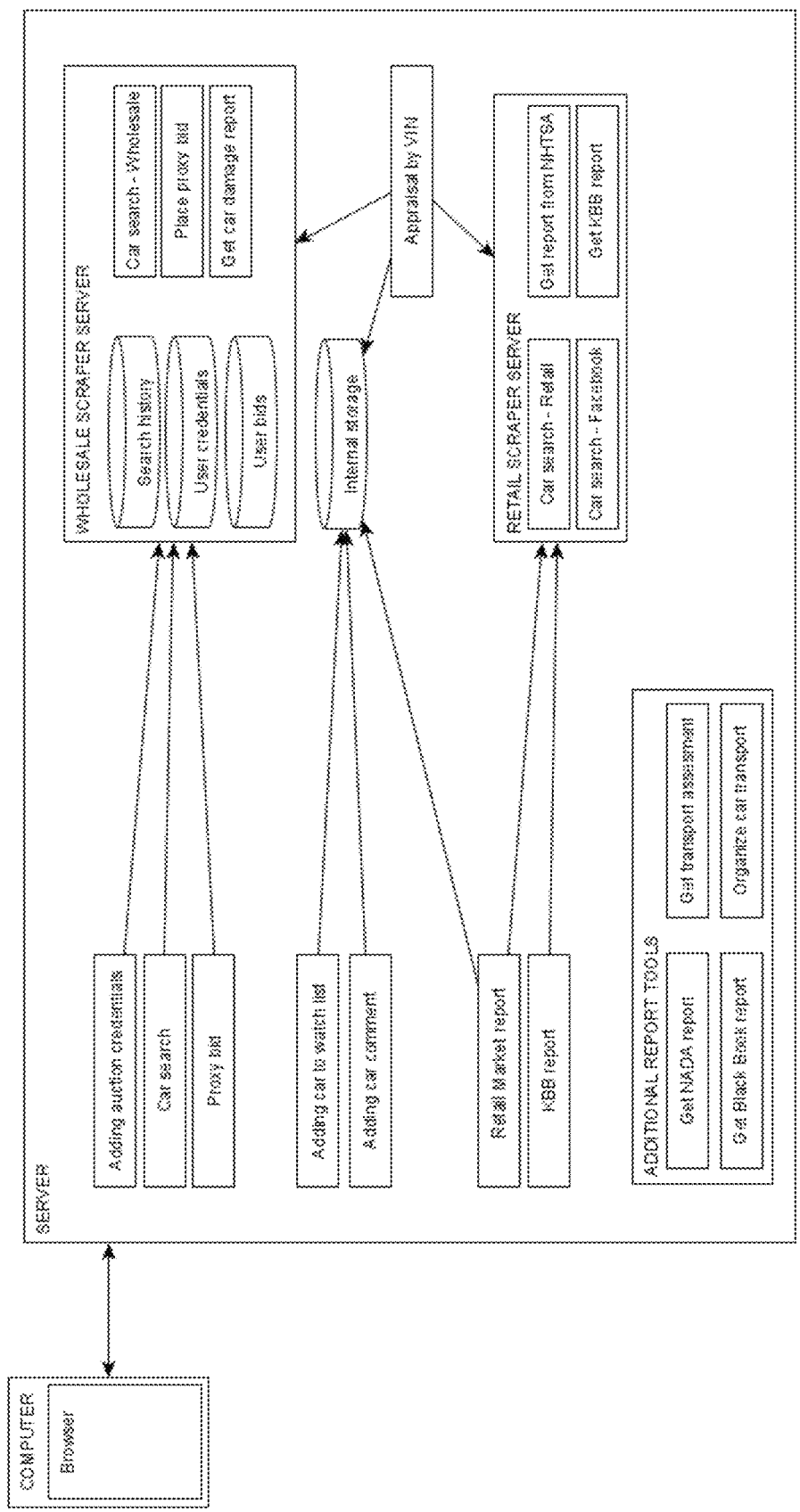
FIG. 1 shows a flow diagram of an embodiment of the present invention.

The above-described drawing figures illustrate aspects of the disclosure in at least one of its exemplary embodiments, which are further defined in detail in the following description.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention and claims therein.

The present system and methods help automotive industry individuals and businesses take advantage of opportunities to acquire cars that they previously would not have been able to purchase due to limitations in the present technology in the field. This may be accomplished through enabling a system to compile unstandardized information from various locations throughout the world and standardizing such information by factoring in various inconsistencies that exist based on fragmented descriptions and standards across the automotive industry. The present invention configures a system to allow users to sort through, track, and organize information in a way that has never existed enabling them to make real time decisions on acquisition of automobiles that would not otherwise be possible.

Computer networks are well known in the art, often having one or more client computers and one or more servers, on which any of the methods and systems of various disclosed embodiments may be implemented. In particular the computer system, or server in this example, may represent any of the computer systems and physical components necessary to perform the computerized methods discussed in connection with the present figures and, in particular, may represent a server (cloud, array, etc.), client, or other computer system upon which e-commerce servers, websites, databases, web browsers and/or web analytic applications may be instantiated.

In one or more embodiments, an exemplary server with an associated database and one or more client computing devices (potentially hundreds or thousands of client computing devices in communication with the server) are generally known to a person of ordinary skill in the art, and each may include a processor, a bus for communicating information, a main memory coupled to the bus for storing information and instructions to be executed by the processor and for storing temporary variables or other intermediate information during the execution of instructions by processor, a static storage device or other non-transitory computer readable medium for storing static information and instructions for the processor, and a storage device, such as a hard disk, may also be provided and coupled to the bus for storing information and instructions. The server and client computers may optionally be coupled to a display for displaying information. However, in the case of servers, such a display may not be present and all administration of the server may be via remote clients. Further, the server and client computers may optionally include connection to an input device for communicating information and command selections to the processor, such as a keyboard, mouse, touchpad, microphone, and the like.

The server and client computers may also include a communication interface coupled to the bus, for providing two-way, wired and/or wireless data communication to and from the server and/or client computers. For example, the communications interface may send and receive signals via a local area network, public network, private network (e.g., a VPN), or other network, including the Internet.

In the present illustrated example, the hard drive of the server (including an optional third-party server and/or mobile app backend service, and the like) and/or one or both of the client computers is encoded with executable instructions, that when executed by a processor cause the processor to perform acts as described herein. The server communicates through the Internet, intranet, or other network with the client computers to cause information and/or graphics to be displayed on the screen, such as HTML code, text, images, and the like. The server may host the URL site with the article or other information, which may be accessed by the client computers. Information transmitted to the client computer may be stored and manipulated according to the methods described below, using the software encoded on the client device. Although the computing devices are illustrated schematically as laptops, the computing devices may include desktops, tablets, cellular devices (e.g., smart phones, such as iOS devices, ANDROID devices, WINDOWS devices, and the like), or any other computing device now known or later developed.

The client computers may be one of many available computing devices capable of running executable programs and/or a browser instance. For example, one or more of the client computers may be a mobile device, such as a tablet computer or a mobile phone device with computer capabilities, a laptop, a desktop, or other computing device. Executable instructions for the present method may be installed on the server that hosts a web application caused to display a user interface on one or both of the agency computing device and applicant computing device. Alternatively, executable instructions for at least part of the present method may be installed locally on one or both of the client computers. Further, a separate set of executable instructions for at least part of the present method may be installed locally on each of the client computers. The client computers may access and interact with the graphical user interface through a web browser instance, such as FIREFOX, CHROME, SAFARI, INTERNET EXPLORER, and the like, or through a desktop application. The web application is hosted on an application server with application hosting capabilities. The client computers may access and interact with the graphical user interface through either a web application running on a mobile web browser or a mobile application (commonly called an "app").

Alternatively, executable instructions for carrying out at least part of the present method may be installed locally on one or both of the client computers. For example, one or both of the client computers may be required to locally install an application on a smartphone device for carrying out all or part of the present method. In an example embodiment, an executable application file is installed on each of the devices, so that messages can be sent to and received from the server, with the server sending, receiving, and/or relaying the messages to both the client computers. The messages may be comprised of various forms of data, such as alpha-numeric text, pictures, links, and so on. In yet another example embodiment, one party may have an application installed on the computing device, while the other party sends and receives messages through a browser instance.

In some embodiments, the present system and methods may be configured with a dashboard module. The dashboard module may be where an end user of the system may find common information such as saved searches, watch lists, proxy bidding capability, and various other settings that may tailor the present system and methods to the user's needs.

In some embodiments, the present system and methods may be configured to enable a user to add specific auction sites that they use in their business. A user may, in some embodiments, for example, select an auction house from a drop-down menu that they would like to add, and configure the login information for such an auction house based on the user's credentials from that auction house.

In some embodiments, the system may be configured to display an error under the if there is something wrong with the auction site configuration to let the user of the system know that they may need to make modifications to their credentials. Additionally, the system may be configured so a user may edit their information with an edit tool to modify, for example, a username and password among other information that may need to be modified.

As shown in the flow diagram of FIG. 1, the present system and methods may, in some embodiments, be configured with a computer and a browser to interact with the server of the present system and methods. In some embodiments, the present system and methods may be configured with a backend server wherein the backend server may be configured with a wholesale scraper server, internal storage, retail scraper server, and additional reporting tools. Within the backend server, the present system and methods may, in some embodiments, be configured with an auction credential adding module that may communicate with a wholesale scraper server module. The backend server may additionally be configured with a car search module that may also be configured to communicate with the wholesale scraper server. Additionally, the backend server may be configured, in some embodiments, with a proxy bidding module. In turn, the proxy bidding module may be configured, in some embodiments to be connected with the wholesale scraper server.

In some embodiments, the present system and methods may be configured with a car watch list module wherein such a module may be configured with a connection to the internal storage of the backend server. The present system and methods may also be configured with a car commenting module wherein the car commenting module may be configured with a connection to the internal storage of the backend server.

In some embodiments, the present system and methods may be configured with a reporting module that may be configured to be connected to the internal storage of the backend server and the retail scraper server of the backend server. Additionally, the present system and methods may be configured to have, for example a KELLY BLUE BOOK reporting module, a NADA reporting module, BLACKBOOK reporting module, transport assessment module, or an organize car transport module. Each of the above modules, in some embodiments, may be connected to the retail scraper server of the present system and methods.

In some embodiments, the present system and methods may be configured with the above-mentioned wholesale scraper server. The wholesale scraper server may, in some embodiments be configured with separate storage modules containing, for example, search history, user credentials, and user bids. The above-mentioned storage modules may be configured to be connected with their respective backend server modules such as, for example, the user bids storage module may be configured to be in connection with the proxy bidding module of the backend server.

Further, the wholesale scraper server may, for example, be configured with a wholesale car search module. Further, the wholesale scraper server may, in some embodiments, be configured with a proxy bid placement module. Further, the wholesale scraper server may, for example, be configured with a damage report retrieval module.

In some embodiments, the retail scraper server may be configured with a retail car search module. Additionally, the retail scraper server may, in some embodiments, be configured with a report retrieval module. The report retrieval module of the retail scraper server may, for example retrieve reports from NHTSA, KBB, or BLACKBOOK. In some embodiments, the retail scraper server may, for example have a car search module that integrates with FACEBOOK car search or other car search platforms such as, for example, EBAY or CRAIGSLIST among various other sales platforms. In some embodiments there may be an external report module that may provide reports from any of the above described external service providers such as KBB, BLACKBOOK, and NHTSA.

In some embodiments, the backend server of the present system and methods may be configured with an appraisal module. The appraisal module, may, in some embodiments, be configured in connection with the retail scraper server, the internal storage of the backend server, as well as the wholesale scraper server. The appraisal module may, in some embodiments utilize a car's VIN number to retrieve information for analysis and appraisal capabilities. In some embodiments, the present system and methods may be configured with a machine learning and/or deep learning module that may provide the system the capability to predict the likelihood of resale and profitability for the end user of the present system and methods in real time. The machine learning and/or deep learning module may also, in some embodiments be trained to predict the type of cars that the end user may be more interested and may filter results based on the users learned preferences.

Figure 2:
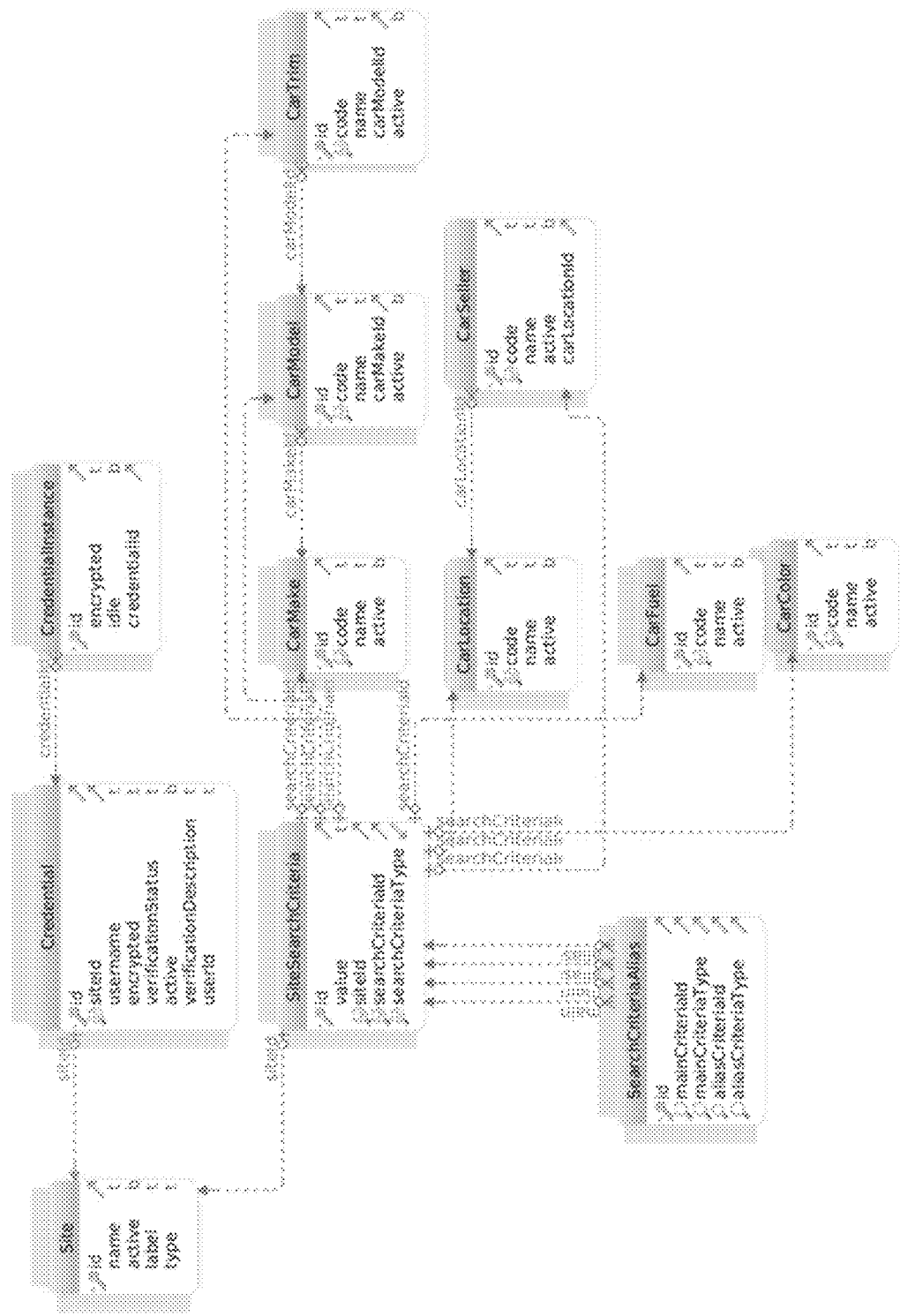
FIG. 2 shows a flow diagram of a relational database of the present invention.

In some embodiments, as shown in the flow diagram of FIG. 2, the present system and methods may be configured to have a database wherein, in some embodiments the database is a relational database with various car details. In some embodiments, for example, the relational database may be configured to have various categories of information such as, site information, credential information, credential instance information, site search information, car make information, car model information, car trim information, car location information, car seller information, search criteria alias information, car fuel information, car color information, as well as many other types of information pertaining the evaluation of a car or vehicle.

In some embodiments, the site information may be configured to be in connection with the credential information and site search criteria information. The credential information may be configured to be in connection with the site information and the credential instance information. The credential instance information may be configured to be connected with the credential information. In some embodiments, the site search information may be configured to be connected with the site information, the search criteria alias information, the car make information, the car model information, the car trim information, the car location information, the car seller information, the car fuel information, and the car color information.

In some embodiments, the car make information may be configured to be connected with the car model information and the site search criteria information. In some embodiments, the car model information may be configured to be connected with the car make information, the car trim information, and the site search criteria information. In some embodiments, the car trim information may be configured to be connected with the car model information and the site search criteria information. In some embodiments, the car location information may be configured to be connected with the car seller information and the site search criteria information. In some embodiments, the car seller information may be configured to be connected with the car location information and the site search criteria information. In some embodiments, the car fuel information may be configured to be connected with the site search criteria information. In some embodiments, the car color information may be configured to be connected with the site search criteria information.

The present system and methods may enable a user to login to a plurality of online auction sites within one web application. The present system and methods may incorporate a proprietary API that may verify user credentials and passwords and then in turn may encrypt and safely store the passwords so only the user and a server making requests may have access to such passwords. The present system and methods may allow a user to conduct a seamless search within one screen to find vehicles of all kinds that may be dispersed across every existing auction platform and future platforms.

The present system and methods may, for example, enable a user to search auction platforms that they may be pre-registered with and certify that the user has been approved to conduct business with such an auction platform. The present system and methods may utilize a proprietary scraping API to search auction platforms based upon a user's input, which may then return results in a standardized output. The present system and methods may use an algorithm to display the searched results of each auction based upon search processing speed or various other criteria.

In some embodiments of the present system and methods, for example, the fastest response auctions may display results first, then, slower auction platforms may be displayed in descending order. The present system and methods may use a proxy server service that may, for example, utilize the geo tags of multiple United States locations. The present system and methods may be configured so that IP requests that may be made are not by any single IP address. Rather, in some embodiments, for example, the IP addresses may variably change and may be processed by multiple internet service providers so the host servers do not detect a single IP address submitting frequent and consistent requests because this may cause the host servers to identify the single IP address as threat and in turn may block the service. In some embodiments the present system and methods may have a proprietary matrix table for the makes, models, trim levels, and various other automotive distinctions. In some embodiments, the present system and methods may create a correlation across different platforms that may be configured to connect parent and child relationships within the data to enable the system to have a user interface that may display standardized data in the same format all the same within a search field.

The present system and methods may be configured to enable a user to keep a watch list for all auctions on one screen. The present system and methods may be configured to enable a user to proxy bid vehicles from within a single screen and then view the user's present proxy bids across all auction sites within the same platform. In some embodiments, the present system and methods may enable a user to update proxy bids across all auction platforms from a single page. This functionality may eliminate the problem of not knowing which proxy bid was used across various web sites across the internet.

In some embodiments of the present system and methods a user may add website credentials for a host auction site that may include both usernames and passwords in the form of raw text on input from the present system (i.e. in an unencrypted form). The present system and methods may then utilize a secure website using HTTPS so that the browser may send the information to a server in an encrypted form. Next, in some embodiments, the server may receive such information, decrypt the information using an HTTPS certificate module, and then receive the raw text. Next, in some embodiment, the system may be configured to use AES-256 and SHA-256 HMAC encryption to create a randomly generated key.

Next, in some embodiments, the system may be configured so the raw text may be encrypted and the raw password text may be removed without any trace in the system. In some embodiments, the present system may be configured so the only way to get back a raw password's text may be through decryption using the present invention's API. The API may be configured to have an Access Control List ("ACL") that may only be accessed by a user that is the credential owner. In some embodiments, even a super admin may not have access in an ACL to read it, this may enable the system to not provide access to anyone except the owner of the credentials. In some embodiments, the system may be configured so that after a user adds credentials in the system, their credentials may not be allowed to immediately be used.

For example, the system may, in some embodiments, use credential verification in the background this may be accomplished by the system checking to see if the credentials may be valid. In the present system and methods a user may be ready to use the system, however, if their credentials are invalid, the system may be configured to lock the credentials and prevent the user's ability to keep trying to call the server for requests. This may be done to assure that faulty credentials will not be used. The system may be configured, for example, to ban a user due to a plurality or retries when attempting to enter the site without valid credentials.

The present system and methods may be configured to accomplish an extremely difficult task of collecting data from a plurality of various automotive auction websites and vehicle auction platforms. The present system and methods may accomplish this tedious task by registering a scraping job specific for each website. The system may be configured to overcome the obstacle of data having to be accessed and scraped differently though different programs. In the present system and methods, the system may be configured take raw data and sort it within a database.

In some embodiments, the present system and methods may clean fragmented data that was retrieved from the multiple sources discussed above. Part of the issue with brining down data from numerous sources is that localities throughout the world may use differing standards, labels, identifiers, or inconsistent terminology for the same things. The present system and methods, in some embodiments, may be able to identify inconsistent data, cleanse and standardize such information, and organize the information in a uniform and standardized manner.

Data cleansing or data cleaning is the process of detecting and correcting corrupt or inaccurate records from a record set, table, or database and refers to identifying incomplete, incorrect, inaccurate or irrelevant parts of the data and then replacing, modifying, or deleting the dirty or coarse data.

In some embodiments, as is depicted in FIG. 1, the present system and methods may be configured with a wholesale scraper server. The wholesale scraper server may conduct scraping of vehicle data and information relevant to wholesale auctions and other various wholesale purchasing options.

In some embodiments, as is depicted in FIG. 1, the present system and methods may be configured with a separate retail scraper server. The wholesale scraper server may be configured to conduct the above referenced scraping of vehicle data and information relevant to retail purchasing options.

Figure 3:
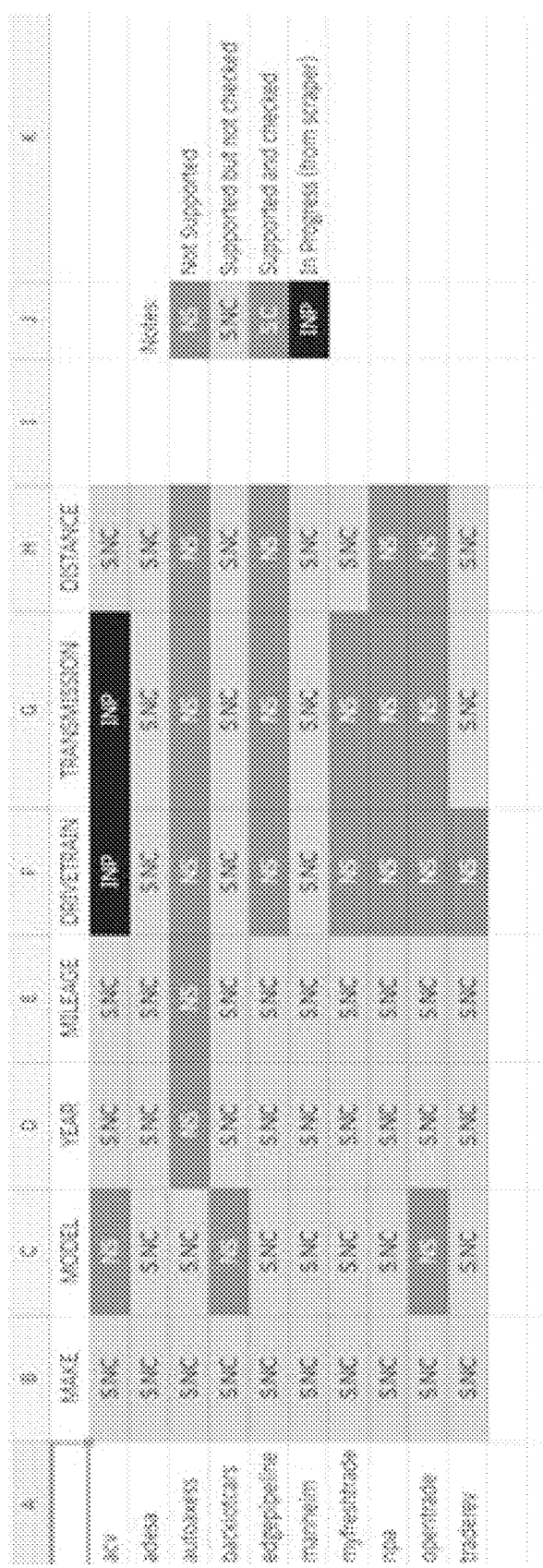
FIG. 3 shows a matrix table depicting fragmented data sources.

The database may be configured to utilize database software such as MONGO.DB. The present system and methods may be configured to display the scraped data as a clean output of data in a consistent and easily identifiable output. The present system and methods may also help with fragmentation of data from some sites that do not support search functions of certain options. For example, as can be seen in FIG. 3, numerous auction platforms do not allow a user to perform searches for simple things such as by model or drive train, type of transmission, or various other automotive identifiers. The present system and methods may utilize the presently described proprietary scraping API to overcome the issue of unsupported searching across various auction platforms.

The present system and methods may be configured to utilize a proxy server service with a geo tag of numerous locations so that the Internet Protocol ("IP") requests that are made are not by any one IP address; rather the IP addresses may change and the requests may be processed by multiple internet service providers so the host servers do not see this functionality as a threat and block the service.

In some embodiments, the present system and methods may utilize a proxy server that may be configured to provide an IP pool. For the purposes of this application the term IP stands for "internet protocol." In some embodiments, for example, the IP pool may be configured to help the system switch between internet service providers so the requests for call signs. In other words, the searches and scrapes may not come from the same underlying IP which would ultimately be blocked. In some embodiments, the proxy service in conjunction with the present system and methods may determine when to switch IPs. The present system and methods may also be configured to know when to use new proxies and when to keep the old proxies to assure the session is still valid, which, in turn, the search becomes faster because when a session is still valid; there may be no need for the system to be required to re-login. The present system and methods may also be configured to provide multiple sessions per account, this way, even if a user is only inserting one account and/or credential, they may still utilize the system for multiple searches in a single account. This may be done because a new search may use a new separate session, and will not overwrite or cascade different search result caused due to a session being shared by multiple searches.

The present system and methods may be configured to utilize a proprietary matrix table to store makes, models, trim levels, and various other automotive details. The present system and methods may be configured to make a correlation across different platforms that may connect parent and child relationships so all of the information appears in a uniform manner within the same search field.

Further, in some embodiments, the present system and methods may loop through all possible values for aspects of an automobile such as, for example, the make, model, and trim for each auction platform. The present system and methods may be configured to compare it with an initially empty table, then, in such an embodiment, if the system has found a new make, model, or matching trim the system may insert such an automobile into the matrix table.

A computer-implemented method is provided which includes receiving, from a client computer to a server, at a vehicle sales search engine a vehicle sales search request associated with a user account (e.g., entered by a currently registered user on their local computer, where the present system can optionally log into one or more third-party accounts associated with the user), the automotive sales search request comprising a vehicle attribution search term (e.g., such as the make, model, trim, year, etc.); responsive to receiving the automotive sales search request associated with the user account, processing the automotive sales search request to retrieve from a database a predetermined list of alias search terms associated with the vehicle attribution search term (e.g., the list of aliases can be alternate naming of a particular vehicle, misspellings of a vehicle attribute, partial matches of a vehicle attribute, variations in naming, etc.); associating, by the server, a proxy IP address with the user account (e.g., masking the origin of the search request); transmitting simultaneously the predetermined list of alias search terms to a first third-party vehicle sales search engine and a second third-party vehicle sales search engine (e.g., transmitting the search requests at the same time or near to the same time to multiple third-party vehicle sales search engines, such as a couple, several, more than five, more than ten, or more than twenty third-party vehicle sales search engines, where the user's third-party account is logged into by the present system for each third-party system) utilizing the proxy IP address; receiving, from the first third-party vehicle sales search engine, a first search result that matches or otherwise corresponds with the predetermined list of alias search terms, where the search result includes a first dataset of vehicle descriptions (e.g., a list of vehicles for sale or on auction within the first third-party system); receiving, from the second third-party vehicle sales search engine, a second search result that matches or otherwise corresponds with the predetermined list of alias search terms, where the search result includes a second dataset of vehicle descriptions (e.g., a list of vehicles for sale or on auction within the second third-party system, and so on for more than two third-party systems); and presenting in a user interface of the client computer the first multiplicity of vehicle descriptions and the second multiplicity of vehicle descriptions presented together in a predetermined order (e.g., the predetermined order of presentation may be vehicle types that the user has indicated as being favorited being forced to the top of the search result, and optionally further ranked by condition, distance from the user's location, mileage, or other search parameters assumed by the present system and/or entered by the user). Optionally, the first dataset of vehicle descriptions includes a first plurality of attribute fields and the second dataset of vehicle descriptions includes a second plurality of attribute fields. Optionally the method further includes matching, by the server, the first plurality of attribute fields to a plurality of standardized fields and the second plurality of attribute fields to the plurality of standardized fields, wherein presenting the first multiplicity of vehicle descriptions and the second multiplicity of vehicle descriptions includes presenting the first multiplicity of vehicle descriptions and the second multiplicity of vehicle descriptions within the plurality of standardized fields. Optionally the method further includes replacing a non-standard vehicle description with a standard vehicle description associated with the non-standard vehicle description within the first multiplicity of vehicle descriptions and the second multiplicity of vehicle descriptions (e.g., when the third-party systems use various abbreviations, misspellings, mislabels, and so, a these non-standard aliases are transformed by the present system, potentially and near simultaneously by the thousands, into a standardized alias or excluded).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A computer-implemented method comprising:
receiving, from a client computer to a server, at a vehicle sales search engine a vehicle sales search request associated with a user account, the vehicle sales search request comprising a vehicle attribution search term;
responsive to receiving the vehicle sales search request associated with the user account, processing, by the server, the vehicle sales search request to retrieve from a database a predetermined list of alias vehicle attribution search terms associated with the vehicle attribution search term;
associating, by the server, a first and second proxy IP address with the user account;
transmitting, by the server, substantially simultaneously the predetermined list of alias vehicle attribution search terms to a first third-party vehicle sales search engine utilizing the first proxy IP address and to a second third-party vehicle sales search engine utilizing the second proxy IP address;
receiving, by the server, from the first third-party vehicle sales search engine, a first search result that matches or otherwise corresponds with the predetermined list of alias vehicle attribution search terms, where the first search result includes a first dataset of vehicle descriptions;
receiving, by the server, from the second third-party vehicle sales search engine, a second search result that matches or otherwise corresponds with the predetermined list of alias vehicle attribution search terms, where the second search result includes a second dataset of vehicle descriptions;
cleaning, by the server, the first and second dataset of vehicle descriptions by:
 i) replacing a non-standard vehicle description with a standard vehicle description associated with the non-standard vehicle description, in the first dataset of vehicle descriptions and the second dataset of vehicle descriptions; and
 ii) replacing, modifying, or deleting at least one of: incorrect, incomplete, or inaccurate data;
presenting in a user interface of the client computer the first dataset of vehicle descriptions and the second dataset of vehicle descriptions presented together in a predetermined order.

2. The computer-implemented method of claim 1 wherein the first dataset of vehicle descriptions includes a first plurality of attribute fields and the second dataset of vehicle descriptions includes a second plurality of attribute fields.

3. The computer-implemented method of claim 2 further comprising matching, by the server, the first plurality of attribute fields to a plurality of standardized fields and the second plurality of attribute fields to the plurality of standardized fields, wherein presenting the first dataset of vehicle descriptions and the second dataset of vehicle descriptions includes presenting the first dataset of vehicle descriptions and the second dataset of vehicle descriptions within the plurality of standardized fields.

4. The computer-implemented method of claim 2 further comprising associating, by the server, a proxy IP address with the user account, and wherein transmitting the predetermined list of alias vehicle attribution search terms to the first third-party vehicle sales search engine and the second third-party vehicle sales search engine includes utilizing the proxy IP address.

5. A computer-implemented method comprising:
receiving, from a client computer to a server, at a vehicle sales search engine a vehicle sales search request associated with a user account, the vehicle sales search request comprising a vehicle attribution search term;
responsive to receiving the vehicle sales search request associated with the user account, processing, by the server, the vehicle sales search request to retrieve from a database a predetermined list of alias vehicle attribution search terms associated with the vehicle attribution search term;
associating, by the server, a first and second proxy IP address with the user account;
transmitting, by the server, the predetermined list of alias vehicle attribution search terms to a first third-party vehicle sales search engine utilizing the first proxy IP address and to a second third-party vehicle sales search engine utilizing the second proxy IP address;
receiving from the first third-party vehicle sales search engine, a first search result that matches or otherwise corresponds with the predetermined list of alias vehicle attribution search terms, where the first search result includes a first dataset of vehicle descriptions;
receiving from the second third-party vehicle sales search engine, a second search result that matches or otherwise corresponds with the predetermined list of alias vehicle attribution search terms, where the second search result includes a second dataset of vehicle descriptions;
cleaning, by the server, the first and second dataset of vehicle descriptions by:
 i) replacing a non-standard vehicle description with a standard vehicle description associated with the non-standard vehicle description, in the first dataset of vehicle descriptions and the second dataset of vehicle descriptions; and
 ii) replacing, modifying, or deleting at least one of: incorrect, incomplete, or inaccurate data;
presenting in a user interface of the client computer the first dataset of vehicle descriptions and the second dataset of vehicle descriptions presented together in a predetermined order.

6. The computer-implemented method of claim 5 wherein the first dataset of vehicle descriptions includes a first plurality of attribute fields and the second dataset of vehicle descriptions includes a second plurality of attribute fields.

7. The computer-implemented method of claim 6 further comprising matching, by the server, the first plurality of attribute fields to a plurality of standardized fields and the second plurality of attribute fields to the plurality of standardized fields, wherein presenting the first dataset of vehicle descriptions and the second dataset of vehicle descriptions includes presenting the first dataset of vehicle descriptions and the second dataset of vehicle descriptions within the plurality of standardized fields.

8. A system comprising:
at least one processor for executing instructions stored in memory; and
a memory storing instructions that when executed by the at least one processor, cause the system to perform operations comprising:
receiving, from a client computer to a server, at a vehicle sales search engine a vehicle sales search request associated with a user account, the vehicle sales search request comprising a vehicle attribution search term;
responsive to receiving the vehicle sales search request associated with the user account, processing the vehicle sales search request to retrieve from a database a predetermined list of alias vehicle attribution search terms associated with the vehicle attribution search term;
associating, by the server, a first and second proxy IP address with the user account;
transmitting, by the server, the predetermined list of alias vehicle attribution search terms to a first third-party vehicle sales search engine utilizing the first proxy IP address and to a second third-party vehicle sales search engine utilizing the second proxy IP address;
receiving, from the first third-party vehicle sales search engine, a first search result that matches or otherwise corresponds with the predetermined list of alias vehicle attribution search terms, where the search result includes a first dataset of vehicle descriptions;
receiving, from the second third-party vehicle sales search engine, a second search result that matches or otherwise corresponds with the predetermined list of alias vehicle attribution search terms, where the second search result includes a second dataset of vehicle descriptions;
cleaning, by the server, the first and second dataset of vehicle descriptions by:
  i) replacing a non-standard vehicle description with a standard vehicle description associated with the non-standard vehicle description, in the first dataset of vehicle descriptions and the second dataset of vehicle descriptions; and
  ii) replacing, modifying, or deleting at least one of: incorrect, incomplete, or inaccurate data;
presenting in a user interface of the client computer the first dataset of vehicle descriptions and the second dataset of vehicle descriptions presented together in a predetermined order.

9. The system of claim 8 wherein the first dataset of vehicle descriptions includes a first plurality of attribute fields and the second dataset of vehicle descriptions includes a second plurality of attribute fields.

10. The system of claim 9 further comprising matching, by the server, the first plurality of attribute fields to a plurality of standardized fields and the second plurality of attribute fields to the plurality of standardized fields, wherein presenting the first dataset of vehicle descriptions and the second dataset of vehicle descriptions includes presenting the first dataset of vehicle descriptions and the second dataset of vehicle descriptions within the plurality of standardized fields.

11. A method for the automated searching of multiple, vehicle sales search engines, comprising:
providing a first database in memory, the first database storing standard vehicle attribution search terms;
providing a second database in memory, the second database storing alias vehicle attribution search terms associated with the standard vehicle attribution search terms;
receiving from a client computer to a server, at a vehicle sales search engine, a vehicle sales search request associated with a user account, the vehicle sales search request comprising at least one standard vehicle attribution search term;
executing by a processor, instructions stored in memory to retrieve from the second database of alias vehicle attribution search terms, a predetermined list of alias vehicle attribution search terms associated with the at least one standard vehicle attribution search term;
associating, by the processor, a first and second proxy IP address with the user account;
transmitting, by the processor, the predetermined list of alias vehicle attribution search terms to a first third-party vehicle sales search engine utilizing the first proxy IP address and to a second third-party vehicle sales search engine utilizing the second proxy IP address;
receiving, from the first third-party vehicle sales search engine, a first search result that matches or otherwise corresponds with the predetermined list of alias vehicle attribution search terms, wherein the first search result includes a first dataset of vehicle descriptions;
receiving, from the second third-party vehicle sales search engine, a second search result that matches or otherwise corresponds with the predetermined list of alias vehicle attribution search terms, wherein the second search result includes a second dataset of vehicle descriptions;
cleaning, by the processor, the first and second dataset of vehicle descriptions by:
  i) replacing a non-standard vehicle description with a standard vehicle description associated with the non-standard vehicle description, in the first dataset of vehicle descriptions and the second dataset of vehicle descriptions; and
  ii) replacing, modifying, or deleting at least one of: incorrect, incomplete, or inaccurate data;
presenting in a user interface of the client computer the first dataset of vehicle descriptions and the second dataset of vehicle descriptions presented together in a predetermined order.

* * * * *